US012110808B2

(12) United States Patent
Yu et al.

(10) Patent No.: US 12,110,808 B2
(45) Date of Patent: Oct. 8, 2024

(54) TITANIUM ALLOY BLADE TIP WITH HIGH ADHESION STRENGTH AND WEAR-RESISTANT PROTECTIVE COATING AND PREPARATION METHOD THEREOF

(71) Applicants: BGRIMM Technology Group, Ltd., Beijing (CN); BGRIMM Advanced Materials Science & Technology Co., Ltd., Beijing (CN)

(72) Inventors: Yueguang Yu, Beijing (CN); Lingfeng Huang, Beijing (CN); Jianming Liu, Beijing (CN); Shuai Wang, Beijing (CN); Xiaoliang Lu, Beijing (CN); Yinghui Cai, Beijing (CN); Rui Guo, Beijing (CN); Tong Liu, Beijing (CN); Dan Guo, Beijing (CN); Chao Wu, Beijing (CN)

(73) Assignees: BGRIMM Technology Group, Ltd., Beijing (CN); BGRIMM Advanced Materials Science & Technology Co., Ltd., Beijing (CN)

( * ) Notice: Subject to any disclaimer, the term of this patent is extended or adjusted under 35 U.S.C. 154(b) by 0 days.

(21) Appl. No.: 18/512,227

(22) Filed: Nov. 17, 2023

(65) Prior Publication Data

US 2024/0167386 A1 May 23, 2024

(30) Foreign Application Priority Data

Nov. 18, 2022 (CN) ......................... 202211458896.9

(51) Int. Cl.

| | |
|---|---|
| ***F01D 5/28*** | (2006.01) |
| ***B05D 1/12*** | (2006.01) |
| ***C23C 4/073*** | (2016.01) |
| ***C23C 28/02*** | (2006.01) |
| ***C25D 5/14*** | (2006.01) |
| ***C25D 7/00*** | (2006.01) |
| ***C25D 15/00*** | (2006.01) |
| ***F01D 11/12*** | (2006.01) |

(52) U.S. Cl.

CPC ............... *F01D 5/288* (2013.01); *B05D 1/12* (2013.01); *C23C 4/073* (2016.01); *C23C 28/022* (2013.01); *C25D 5/14* (2013.01); *C25D 7/00* (2013.01); *C25D 15/00* (2013.01); *F01D 11/122* (2013.01)

(58) Field of Classification Search

CPC .. C25D 5/14; C25D 5/34; C25D 15/00; F01D 11/122; F01D 5/288; C23C 4/073; C23C 28/022

See application file for complete search history.

(56) References Cited

U.S. PATENT DOCUMENTS

| | | | | |
|---|---|---|---|---|
| 5,076,897 | A | 12/1991 | Wride et al. | |
| 6,194,086 | B1 * | 2/2001 | Nenov .................... | C23C 28/00 428/678 |
| 2009/0311552 | A1 * | 12/2009 | Manier .................. | C23C 4/073 428/614 |
| 2021/0285110 | A1 * | 9/2021 | Martel ..................... | C25D 5/14 |

FOREIGN PATENT DOCUMENTS

| | | | |
|---|---|---|---|
| CN | 102115836 | A | 7/2011 |
| CN | 112048741 | A | 12/2020 |

OTHER PUBLICATIONS

CNIPA, Notification of First Office Action for CN202211458896.9, Feb. 1, 2023.

Beijing General Research Institute of Mining and Metallurgy (Applicant), Reply to Notification of a First Office Action for CN202211458896.9, w/ replacement claims, Feb. 14, 2023.

Beijing General Research Institute of Mining and Metallurgy (Applicant), Supplemental Reply to Notification of a First Office Action for CN202211458896.9, w/ (allowed) replacement claims, Feb. 16, 2023.

CNIPA, Notification to grant patent right for invention in CN202211458896.9, Feb. 23, 2023.

* cited by examiner

*Primary Examiner* — Kregg T Brooks

(74) *Attorney, Agent, or Firm* — Hemisphere Law, PLLC; Zhigang Ma

(57) ABSTRACT

A titanium alloy blade tip with a wear-resistant protective coating and a preparation method thereof are provided. The method includes: (1) spraying MCrAlY alloy powder on a surface of a titanium alloy blade tip by high velocity oxygen fuel (HVOF) spraying at a spraying distance of 300-400 mm to obtain the titanium alloy blade tip with a MCrAlY layer on the surface; where M is one of Ni and NiCo; (2) pre-plating Ni at a current density of 4-10 A/dm$^2$; (3) placing the pre-plated titanium alloy blade tip in a Watt solution, covering a surface of the pre-plated titanium alloy blade tip obtained in the step (2) with abrasive particles, and then performing composite electroplating at a current density of 0.5-2 A/dm$^2$. In the method, the wear-resistant protective coating with the high adhesion strength is prepared on the titanium alloy blade tip, and the wear-resistant protective coating has good wear resistance.

7 Claims, 6 Drawing Sheets

TITANIUM ALLOY BLADE TIP WITH HIGH ADHESION STRENGTH AND WEAR-RESISTANT PROTECTIVE COATING AND PREPARATION METHOD THEREOF

TECHNICAL FIELD

The disclosure relates to the field of wear-resistant protective coating technologies, and more particularly to a titanium alloy blade tip with a high adhesion strength and wear-resistant protective coating and a preparation method thereof.

BACKGROUND

Titanium alloy has advantages of high strength and light weight, and is widely used in aerospace engines (also referred to as aero-engines). When titanium alloy blades are in service at high temperature and high speed, they are prone to collide with a casing at high speed and generate a lot of friction heat. Under high oxygen partial pressure and high temperature, titanium alloy will burn irrepressibly, which can burn the blades and the casing within 5-10 seconds (s), resulting in catastrophic accidents. In order to reduce the occurrence of titanium fire accidents, a wear-resistant protective coating with hard abrasive particles is prepared on the blade tip of the titanium alloy blade, and edge angles of the abrasive particles are used to endow the blade tip with cutting tool characteristics, thus reducing friction resistance, reducing friction heat and effectively preventing titanium fire.

Since the surface of the titanium alloy is prone to form a loose oxide film, even if the oxide film is removed before plating, an oxide film layer will be formed again quickly in the air or a plating solution, which affects a adhesion strength between the coating and a matrix. Therefore, it is difficult to effectively combine the high strength composite coating with the hard abrasive particles with the titanium alloy by using the traditional composite electroplating process alone, resulting in the wear-resistant protective coating on the titanium alloy blade tip being easy to peel off due to abrasion.

SUMMARY

An objective of the disclosure is to provide a titanium alloy blade tip with a wear-resistant protective coating with a high adhesion strength and a preparation method thereof, in order to overcome the defects that the wear-resistant protective coating on a blade tip of a titanium alloy blade in the related art is weak in adhesion and easy to peel off due to abrasion.

In order to achieve the above objective, in a first aspect, the disclosure provides a preparation method of a titanium alloy blade tip with a wear-resistant protective coating with a high adhesion strength, which includes the following steps:

step (1) spraying M-chromium-aluminum-yttrium (MCrAlY) alloy powder on a surface of a titanium alloy blade tip by a high velocity oxygen fuel spraying process at a spraying distance in a range of 300-400 millimeters (mm) to obtain the titanium alloy blade tip with a MCrAlY layer on the surface; wherein M is one of nickel (Ni) and nickel-cobalt (NiCo);

step (2) pre-plating Ni at a current density in a range of 4-10 amperes per square decimeter ($A/dm^2$) on the titanium alloy blade tip with the MCrAlY layer to obtain a pre-plated titanium alloy blade tip;

step (3) placing the pre-plated titanium alloy blade tip in a Watt solution, covering a surface of the pre-plated titanium alloy blade tip obtained in the step (2) with abrasive particles, and then performing composite electroplating at a current density in a range of 0.5-2 $A/dm^2$, so as to obtain the titanium alloy blade tip with the wear-resistant protective coating.

In some illustrated embodiments, in the step (1), a thickness of the MCrAlY layer is in a range of 10-100 micrometers (μm).

In some illustrated embodiments, a particle size of the MCrAlY alloy powder is in a range of 270-500 μm.

In some illustrated embodiments, in the step (1), conditions of the high velocity oxygen fuel spraying process include: 40-60 grams per minute (g/min) of powder feeding rate, 16-30 liter per minute (L/min) of kerosene flow rate, in a specific embodiment, the kerosene flow rate is 20-30 L/min; and 600-1000 L/min of oxygen flow rate, in a specific embodiment, the oxygen flow rate is 800-1000 L/min.

In some illustrated embodiments, the preparation method further includes the following step: in the step (1), optionally cleaning titanium alloy blade tip, then carrying out sand blasting treatment, and then carrying out the high velocity oxygen fuel spraying process.

In some illustrated embodiments, a process of the sand blasting treatment includes sand blasting with inorganic compound particles under compressed air, where an air pressure of the compressed air is in a range of 0.5-1 bar, sand blasting time of a blade tip of a single blade is in a range of 5-10 s, the inorganic compound particles are 24 #-60 # (also referred to as 24-60 mesh particle size) sand particles, and the inorganic compound particles are at least one of aluminum oxide and silicon carbide particles.

In some illustrated embodiments, the cleaning process includes: ultrasonically cleaning the titanium alloy blade tip with an organic solvent for 5-10 min, then ultrasonically cleaning with water for 3-5 min, and drying.

In some illustrated embodiments, in the step (2), pre-plating time of nickel is in a range of 2-6 min.

In some illustrated embodiments, in the step (2), a pre-plating solution used in the pre-plating of nickel includes 80-160 grams per liter (g/L) of nickel chloride, in a specific embodiment, 120-160 g/L of nickel chloride; 20-40 g/L of boric acid, in a specific embodiment, 36-40 g/L of boric acid, and optionally 0-100 milliliters per liter (mL/L) of hydrochloric acid, where a content hydrogen chloride (HCl) in the hydrochloric acid is 30-40 weight percentage (wt %).

In some illustrated embodiments, in the step (3), time of the composite electroplating is in a range of 0.5-3 hours (h); the Watt solution includes 280-350 g/L of nickel sulfate, 40-150 g/L of nickel chloride and 36-40 g/L of boric acid.

In some illustrated embodiments, a thickness of a composite coating formed in the step (3) is in a range of 5-30 μm.

In some illustrated embodiments, in the step (3), the abrasive particles are selected from at least one of cubic boron nitride, aluminum oxide, and silicon carbide.

In some illustrated embodiments, particle sizes of the abrasive particles are in a range of 50-300 μm.

In some illustrated embodiments, the preparation method further includes: step (4) removing unfixed abrasive particles after the composite electroplating in the step (3) is completed; then filling a thickened coating of single metal or multi-metal between the fixed abrasive particles by electroplating.

In some illustrated embodiments, a thickness of the thickened coating is in a range of 20-200 μm.

In some illustrated embodiments, an electroplating solution used for the composite electroplating includes 280-350 g/L of nickel sulfate, 40-150 g/L of nickel chloride and 36-40 g/L of boric acid.

In some illustrated embodiments, electroplating conditions include: the current density is in a range of 1.5-2 $A/dm^2$, and electroplating time is in a range of 1-4 h.

In a second aspect, the disclosure provides a titanium alloy blade tip with a wear-resistant protective coating with a high adhesion strength, the wear-resistant protective coating includes a MCrAlY layer and a metal-abrasive composite coating sequentially bonded on the surface of the titanium alloy blade tip, where M is one of Ni and NiCo. The metal-abrasive composite coating includes a nickel coating and the abrasive particles at least partially dispersed in the nickel coating.

In some illustrated embodiments, a thickness of the MCrAlY layer is in a range of 10-100 μm, and a thickness of the metal-abrasive composite coating is 5-300 μm.

In some illustrated embodiments, a bonding strength between the wear-resistant protective coating and the titanium alloy blade tip through an adhesive-tensile test is greater than 65 megapascals (MPa); in a scraping and grinding test against an stationary substrate having zirconia sprayed coating (also referred to as zirconia spray-coated ring segment) with a hardness HR15Y of 80-85, under conditions of ambient temperature of 600° C., linear velocity of 350 meters per second (m/s), relative radial velocity of 50 micrometer per second (μm/s) and radial grinding depth of 500 μm, a thickness reduction of the wear-resistant protective coating on the titanium alloy blade tip is less than 0.01 mm.

In some illustrated embodiments, the titanium alloy blade tip with the wear-resistant protective coating is prepared by the method described in the first aspect.

According to the preparation method provided by the disclosure, the MCrAlY layer is firstly formed on the surface of the titanium alloy blade tip, and then the nickel is rapidly pre-plated at a high current density of 4-10 $A/dm^2$, which is more beneficial to obtaining higher bonding strength (more than 150 MPa) between the composite nickel coating formed by the subsequent composite electroplating and the MCrAlY layer. Because the high current can enrich $H^+$ ions on the surface of the cathode MCrAlY layer and clean impurities such as the surface oxide film, and electrolytic mass transfer in pre-plating nickel can be highly efficient, thus ensuring the deposition of the coating at a high current. Therefore, the bonding force of the protective coating on the surface of titanium alloy blade tip can be significantly improved, the wear resistance of the titanium alloy blade tip can be increased, and the risk of titanium fire caused by the collision and abrasion of the titanium alloy blade can be effectively avoided by matching with flame-retardant abradable sealing coating on the ring segment, which is of great significance for improving the operational reliability of the aero-engine.

The titanium alloy blade tip with the wear-resistant protective coating with the high adhesion strength has a bonding strength of more than 65 MPa between the wear-resistant protective coating and the titanium alloy blade tip, and can work for a long period of time in a temperature environment below 600° C.

BRIEF DESCRIPTION OF DRAWINGS

In order to describe technical solutions of embodiments of the disclosure more clearly, the drawings will be briefly introduced below. It should be understood that the following drawings only illustrate some embodiments of the disclosure, and therefore should not be regarded as limiting the scope. For those skilled in the art, other related drawings can be obtained according to these drawings without creative work.

DESCRIPTION OF REFERENCE SIGNS

Figure 1:
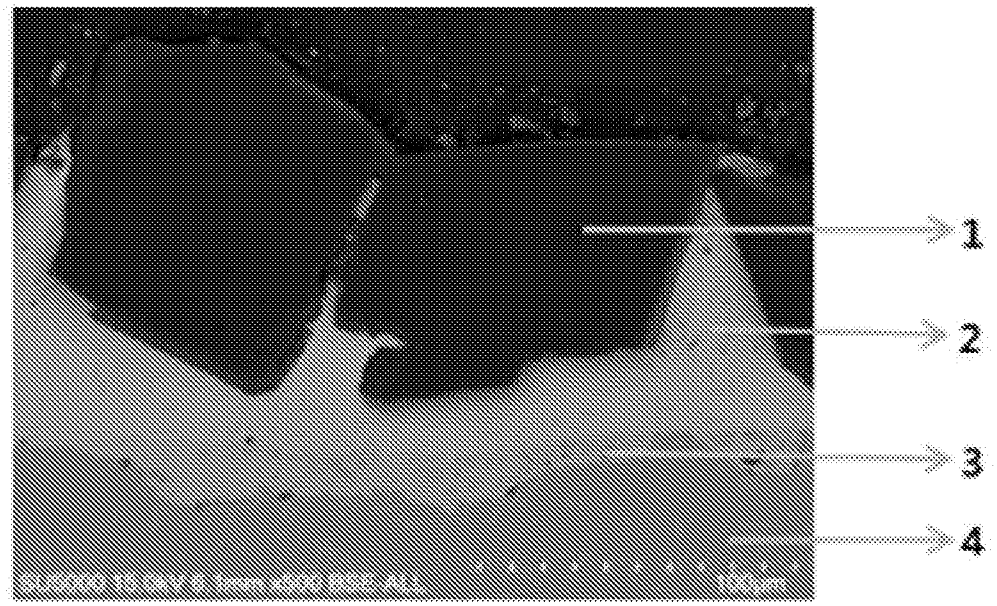
FIG. 1 illustrates a cross-sectional microstructure of a TC4 titanium alloy experimental blade tip with a wear-resistant protective coating with a high adhesion strength according to an embodiment 1 of the disclosure.

1. cubic boron nitride (cBN) abrasive particles, 2. nickel (Ni) bonding matrix, 3. nickel-cobalt-chromium-aluminum-yttrium (NiCoCrAlY) base layer, 4. TC4 titanium alloy substrate.

DETAILED DESCRIPTION OF EMBODIMENTS

Neither end values of ranges or any values disclosed herein are limited to these precise ranges or values, and these ranges or values should be understood to include values close to these ranges or values. With respect to numerical ranges, one or more new numerical ranges may be obtained by combining the end values of various ranges, end values of various ranges and individual point values, and individual point values; and these numerical ranges should be considered as specifically disclosed herein.

In a first aspect, the disclosure provides a preparation method of a titanium alloy blade tip with a wear-resistant protective coating with a high adhesion strength, which includes the following steps:

step (1) spraying MCrAlY alloy powder on a surface of a titanium alloy blade tip by a high velocity oxygen fuel (HVOF) spraying process at a spraying distance in a range of 300-400 millimeters (mm) to obtain a titanium alloy blade tip with a MCrAlY layer on the surface; wherein M is one of Ni and NiCo;

step (2) subsequently pre-plating Ni at a current density in a range of 4-10 amperes per square decimeter (A/dm$^2$) on the titanium alloy blade tip with the MCrAlY layer to obtain a pre-plated titanium alloy blade tip;

step (3) placing the pre-plated titanium alloy blade tip in a Watt solution, covering a surface of the pre-plated titanium alloy blade tip obtained in the step (2) with abrasive particles, and then performing composite electroplating at a current density in a range of 0.5-2 A/dm$^2$, so as to obtain the titanium alloy blade tip with the wear-resistant protective coating.

According to the disclosure, the MCrAlY alloy powder is firstly sprayed on the surface of the titanium alloy blade tip by the high velocity oxygen fuel spraying process, which is beneficial to the subsequent composite electroplating of abrasive particles, and has good stability and high bonding force.

In the step (1), the content of each alloy element in the MCrAlY alloy powder of the disclosure can be determined by those skilled in the art according to actual requirements of hardness, oxidation resistance, corrosion resistance of the substrate. Generally, the content of Cr in the MCrAlY alloy powder is 24-26.5 wt %, the content of Al is 5.5-8.0 wt %, the content of Y is 0.35-0.85 wt %, and the rest is M. When M is NiCo, the content of Co in the MCrAlY alloy powder is 20-24 wt %.

In some illustrated embodiments, in the step (1), a thickness of the MCrAlY layer is 10-100 micrometers (μm).

According to the high velocity oxygen fuel spraying process, the MCrAlY alloy powder and the titanium alloy blade tip can form metallurgical bond under the process condition of lower temperature, so that the defect that the titanium alloy is not resistant to high temperature can be avoided while obtaining a high bonding force, and the bonding strength of the obtained MCrAlY layer and the titanium alloy blade tip is more than 65 megapascals (MPa).

In some illustrated embodiments, the particle size of the MCrAlY alloy powder ranges from 270 to 500 μm. In this specific solution, the particle size of MCrAlY alloy powder can make the alloy powder in a fully molten state during spraying, and at the same time, the molten liquid has a suitable high fluidity, which is more conducive to realizing rapid spraying and improving the bonding force between the molten liquid and the substrate without blocking the equipment pipeline.

The spraying distance is in a range of 300-400 mm, for example, 300, 310, 320, 330, 340, 350, 360, 370, 380, 390, 400 mm, etc., in a specific embodiment, the spraying distance is 320-400 mm.

In some illustrated embodiments, conditions of the high velocity oxygen fuel spraying process include: 40-60 grams per minute (g/min) of powder feeding rate, in a specific embodiment, the powder feeding rate is 40-50 g/min, 16-30 liter per minute (L/min) of kerosene flow rate, and 600-1000 L/min of oxygen flow rate.

In some illustrated embodiments, the conditions of the high velocity oxygen fuel spraying process include: 40-60 g/min of powder feeding rate, 20-30 L/min of kerosene flow rate, and 800-1000 L/min of oxygen flow rate. Under the specific solution of the disclosure, the flame temperature can reach a suitable range by the cooperation of oxygen and kerosene with a suitable flow rate, so that the MCrAlY alloy powder can be fully melted. With a suitable spraying distance and powder feeding rate, the MCrAlY alloy can be sprayed and fed to the center of the spraying flame flow to form a concentrated molten powder spraying angle under the condition that the temperature of the titanium alloy substrate is suitable, so that the energy is concentrated, the spraying speed is high, the particles are completely melted, the coating bonding force is high, which is more conducive to enhancing the bonding force between the MCrAlY layer and the substrate.

The kerosene flow rate is in a range of 20-30 L/min, for example, 20, 21, 22, 23, 24, 25, 26, 27, 28, 29, 30 L/min, etc.

The oxygen flow rate is in a range of 800-1000 L/min, for example, 800, 820, 850, 880, 900, 920, 950, 960, 980, 1000 L/min, etc.

Powder feeding carrier gas and its flow rate can be selected by those skilled in the art according to the required powder feeding rate, as long as powder feeding can be realized without affecting spraying. For example, the flow rate of the powder feeding carrier gas is 5-20 L/min, and the powder feeding carrier gas may be a protective gas such as nitrogen and argon.

The spraying time can be selected by those skilled in the art according to the thickness of the MCrAlY layer to be sprayed and the process parameters of the high velocity oxygen fuel spraying process. In a specific embodiment, the spraying time is 10-30 s.

In the high velocity oxygen fuel spraying process of the disclosure, the substrate temperature in the whole process is less than or equal to 150° C., and the structure and performance of the titanium alloy blade will not be affected.

In some illustrated embodiments, the preparation method further includes the following steps: in the step (1), optionally cleaning titanium alloy blade tip, then carrying out sand blasting treatment, and then carrying out the high velocity oxygen fuel spraying process.

In some illustrated embodiments, the process of the sand blasting treatment includes sand blasting with inorganic compound particles under compressed air, and the sand blasting marks on each part of the surface of the titanium alloy blade tip are uniform.

In a specific embodiment, the air pressure of the compressed air is in range of 0.5-1 bar.

In a specific embodiment, sand blasting time of the blade tip of a single blade is in a range of 5-10 s.

In a specific embodiment, the inorganic compound particles are 24 #-60 #(also referred to as 24-60 mesh particle size) sand particles. According to the specific solution of the disclosure, the particle size of the sand used for sand blasting can make the surface of the titanium alloy blade tip base have appropriate roughness, which is more conducive to enhancing the bonding strength between the MCrAlY layer and the titanium alloy blade tip, and further improving the bonding strength between the whole wear-resistant protective coating and the titanium alloy blade tip.

In a specific embodiment, the inorganic compound particles are at least one of aluminum oxide and silicon carbide particles.

In some illustrated embodiments, the cleaning process includes: titanium alloy blade tip with an organic solvent for 5-10 min, then ultrasonically cleaning with water for 3-5 min, and drying. In a specific embodiment, the organic solvent is anhydrous ethanol or acetone.

In some illustrated embodiments, in the step (2), pre-plating time of nickel is in a range of 2-6 min.

In the step (2), a pre-plating solution used in the pre-plating of nickel includes nickel chloride, boric acid and optional hydrochloric acid. In some illustrated embodiments, the pre-plating solution used in the pre-plating of nickel includes 80-160 g/L of nickel chloride and 20-40 g/L of boric acid.

The nickel chloride is in a range of 80-160 g/L, for example, 80, 90, 100, 110, 120, 130, 140, 150, 160 g/L, etc.

The boric acid is in a range of 20-40 g/L, for example, 20, 25, 30, 35, 36, 37, 38, 39, 40 g/L, etc.

In some illustrated embodiments, the pre-plating solution used in the pre-plating of nickel includes 120-160 g/L of nickel chloride and 36-40 g/L of boric acid. Under the specific solution of the disclosure, it is more beneficial to improve the bonding force between the coating and the titanium alloy blade tip and enhance the wear resistance.

In some illustrated embodiments, the pre-plating solution used in the pre-plating nickel also includes 0-100 mL/L of optional hydrochloric acid, where the content of hydrogen chloride (HCl) in the hydrochloric acid is 30-40 wt %. It can be understood that hydrochloric acid herein refers to an aqueous solution of HCl.

In the step (2), after the nickel pre-plating, optional cleaning can be carried out by those skilled in the art according to actual needs. In a specific embodiment, the step (2) further includes washing with deionized water after the nickel pre-plating.

In the step (3), the abrasive particles are fully covered on the surface of the titanium alloy blade tip obtained in the step (2), which is used for realizing full electroplating and more densely arranging the abrasive particles on the surface of the titanium alloy blade tip in composite electroplating.

In some illustrated embodiments, in the step (3), the composite electroplating time is in a range of 0.5-3 h.

In some illustrated embodiments, the Watt solution includes 280-350 g/L of nickel sulfate, 40-150 g/L of nickel chloride and 36-40 g/L of boric acid. Under the specific solution, nickel chloride is more conducive to efficient electrolytic mass transfer and improves the bonding force of a composite electroplating layer.

In some illustrated embodiments, a thickness of a composite coating formed in the step (3) is in a range of 5-30 μm.

In some illustrated embodiments, in the step (3), the abrasive particles are selected from at least one of cubic boron nitride (cBN), aluminum oxide ($Al_2O_3$) and silicon carbide (SiC).

In a specific embodiment, particle sizes of the abrasive particles are in a range of 50-300 μm.

In some illustrated embodiments, the preparation method further includes: step (4) removing unfixed abrasive particles after the composite electroplating in the step (3) is completed; then filling a thickened coating of single metal or multi-metal between the fixed abrasive particles by electroplating. In this specific solution, the thickened coating can ensure the firm engagement of the hard abrasive particles.

In some illustrated embodiments, a thickness of the thickened coating is in a range of 20-200 μm. The thickness of the thickened coating here is only the thickness grown in the thickened electroplating step after the abrasive particles are fixed, excluding the thickness of the composite coating.

The electroplating solution and conditions can be selected by those skilled in the art according to actual needs. It should be understood that the electroplating method includes: placing the titanium alloy blade tip obtained after composite electroplating in the electroplating solution for electroplating.

In a specific embodiment, the electroplating solution used for electroplating includes 280-350 g/L of nickel sulfate, 40-150 g/L of nickel chloride and 36-40 g/L of boric acid. In another specific embodiment, the electroplating solution includes 300-400 g/L of nickel sulfate, 50-150 g/L of cobalt sulfate, and 36-40 g/L of boric acid.

In some illustrated embodiments, the electroplating conditions include current density of 1.5-2 A/dm$^2$ and electroplating time of 1-4 h.

In some illustrated embodiments, the removal of unfixed abrasive particles removes unfixed attached loose abrasive particles by deionized water rinsing.

The single metal or multi-metal in the thickened coating can be selected by those skilled in the art according to requirements, such as nickel, nickel-cobalt alloy and the like.

In a second aspect, the disclosure provides a titanium alloy blade tip with a wear-resistant protective coating with a high adhesion strength, the wear-resistant protective coating includes a MCrAlY layer and a metal-abrasive composite coating sequentially bonded on the surface of the titanium alloy blade tip, where M is one of Ni and NiCo. The metal-abrasive composite coating includes a nickel coating and abrasive particles at least partially dispersed in the nickel coating.

It can be understood that in the metal-abrasive composite coating, the abrasive particles can be partially exposed, that is, the top of the abrasive particles protrude outward along the nickel coating and is exposed.

In some illustrated embodiments, the titanium alloy blade tip with the wear-resistant protective coating is prepared by the method described in the first aspect.

In some illustrated embodiments, the thickness of the MCrAlY layer is in a range of 10-100 μm, and the thickness of the metal-abrasive composite coating is in a range of 5-300 μm. It should be understood that the metal-abrasive composite coating includes the composite coating and the thickened coating in the first aspect, whereby there will still be an exposed top of the abrasive particles as the thickened coating is filled between the abrasive particles. The thickness of the metal-abrasive composite coating refers to the thickness from the bottom of the nickel coating to the exposed top of abrasive particles.

In some illustrated embodiments, the bonding strength between the wear-resistant protective coating and the titanium alloy blade tip is greater than 65 MPa (film bonding strength limit) through the adhesive-tensile test.

In some illustrated embodiments, in a scraping and grinding test with an outer ring segment of a zirconia sprayed coating with hardness value HR15Y of 80-85, under conditions of ambient temperature of 600° ° C., linear speed of 350 meters per second (m/s), relative radial velocity of 50 micrometer per second (μm/s) and radial grinding depth of 500 μm, a thickness reduction of the wear-resistant protective coating on the titanium alloy blade tip is less than 0.01 mm. In the disclosure, the zirconia spraying coating means that zirconia is sprayed on a rotor outer ring segment, which is an important part of the compressor part and is an object for the blade tip of the rotor blade to collide and grind.

It should be understood that the relative radial velocity and radial grinding depth may be that the titanium alloy blade tip makes relative motion at a preset speed to the zirconia sprayed coating on in the radial direction and moves to a preset grinding depth; or may be that the zirconia sprayed coating can move relative to the titanium alloy blade tip at a preset speed in the radial direction and move to a preset grinding depth.

The titanium alloy blade tip with the wear-resistant protective coating with high adhesion strength can be applied to the titanium alloy blade at the compressor part of an aero-engine, and is used for preventing the accident that the titanium alloy blade collides and grinds under the working conditions of high temperature and high oxygen partial pressure to generate titanium fire, and is matched with the flame-retardant sealing coating for grinding to improve the sealing performance of the aero-engine.

The disclosure will be further described in detail with specific embodiments. Specifically, an average bonding strength refers to an average value of three measurements.

Embodiment 1

In this embodiment, a wear-resistant protective coating with a high adhesion strength is prepared on an experimental blade tip profile of a titanium alloy with a width of 2 mm and a length of 25 mm, and the brand of the titanium alloy is TC4 (also referred to as Ti-6Al-4V titanium alloy). The preparation steps are as follows.

1. The surface of the experimental blade tip profile of TC4 titanium alloy is immersed in acetone for ultrasonic cleaning for 5 min, then immersed in deionized water for 3 min and taken out for drying.
2. The surface of the experimental blade tip profile of TC4 titanium alloy is subjected to sand blasting treatment with 40 # aluminum oxide particles under 0.6 bar air pressure for 10 s, so as to ensure the uniform sand blasting marks in all parts of the experimental blade tip surface.
3. 300 g NiCoCrAlY powder is added into a powder feeder of a high velocity oxygen fuel spraying equipment, the particle size of the powder is 270-500 μm, and the powder composition is 20-24 wt % of Co, 24-26.5 wt % of Cr. 5.5-8.0 wt % of Al, 0.35-0.85 wt % of Y and the rest of Ni. The parameters of high velocity oxygen fuel spraying are 900 L/min of oxygen flow rate, 24 L/min of kerosene flow rate, 380 mm of spraying distance, 9 L/min of flow rate of powder carrier gas (argon), 40 g/min of powder feeding rate. The NiCoCrAlY substrate with a thickness of about 20 μm is sprayed on the experimental blade tip surface of TC4 titanium alloy.
4. The sprayed experimental blade tip of TC4 titanium alloy is put into a plating solution containing 120 g/L of nickel chloride and 40 g/L of boric acid, nickel pre-plating for 4 min at a current density of 6 $A/dm^2$, then taken out and rinsed with deionized water.
5. The experimental blade tip of TC4 titanium alloy is put into a plating solution containing 300 g/L nickel sulfate, 50 g/L nickel chloride and 36 g/L boric acid, spread enough cBN abrasive particles with the particle size of 140-170 mesh on the surface of the blade tip, and the blade tip is not exposed is visually observed. The composite electroplating is carried out at the current density of 0.5 $A/dm^2$ for 1.5 h, then the surface of the blade tip is rinsed with deionized water to remove unbonded the cBN abrasive particles. The thickness of nickel composite coating bonded with the cBN abrasive particles is about 15 μm.
6. The experimental blade tip of TC4 titanium alloy is placed in a plating solution containing 300 g/L nickel sulfate, 50 g/L nickel chloride and 36 g/L boric acid, and electroplated at a current density of 1.5 $A/dm^2$ for 2 h. The thickness of the nickel coating of the thickened coating is about 60 μm, and the nickel coating allowed to grow to fill in gaps between the abrasive particles, so as to obtain the titanium alloy blade tip with the wear-resistant protective coating. Specifically, the total thickness of the metal-abrasive composite coating composed of the composite coating and the thickened coating is about 80 μm, and the total thickness is higher than the sum of the thickness of the thickened coating and the composite coating because the top of abrasive particles is exposed.

Figure 2:
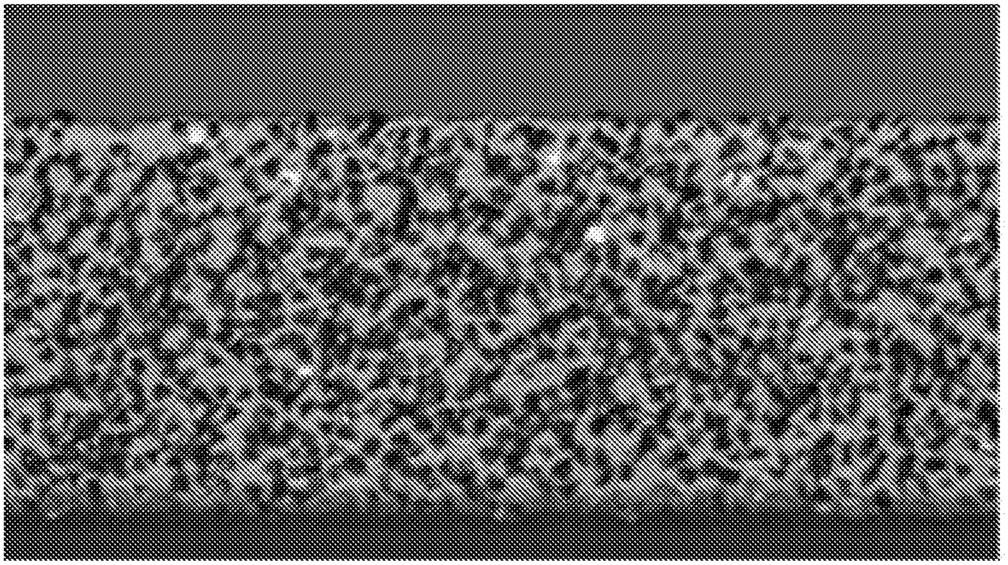
FIG. 2 illustrates a microscopic morphology of a surface of the TC4 titanium alloy experimental blade tip with the wear-resistant protective coating with the high adhesion strength according to the embodiment 1 of the disclosure.
Figure 3:
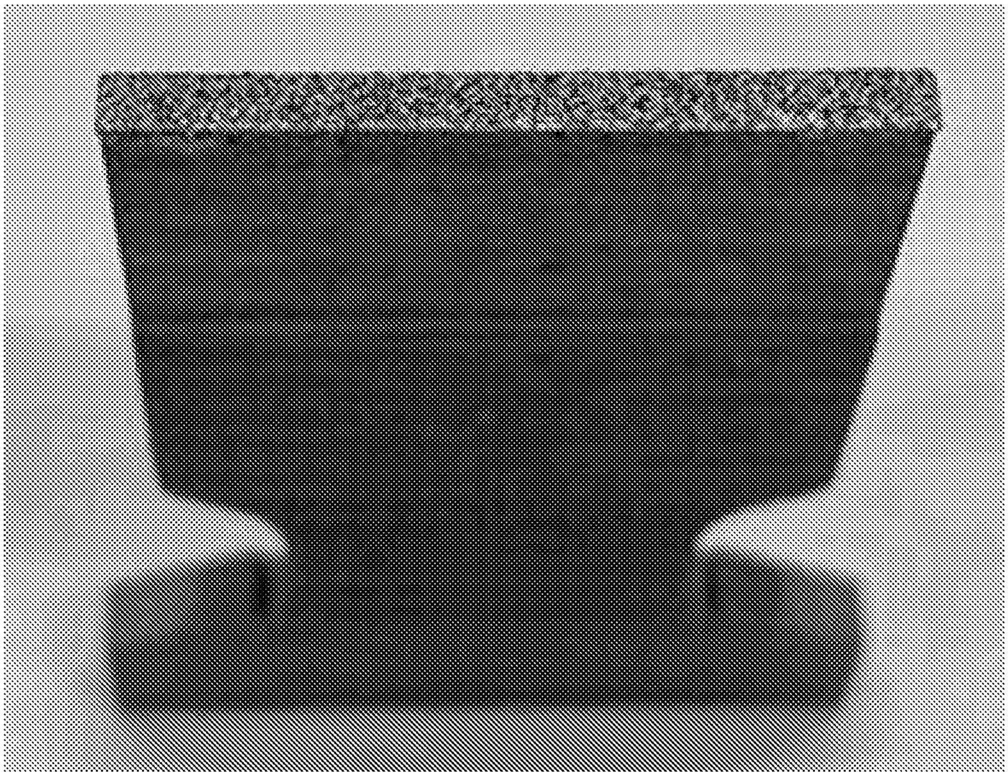
FIG. 3 illustrates an appearance of the TC4 titanium alloy experimental blade tip with the wear-resistant protective coating with the high adhesion strength according to the embodiment 1 of the disclosure.
Figure 4:
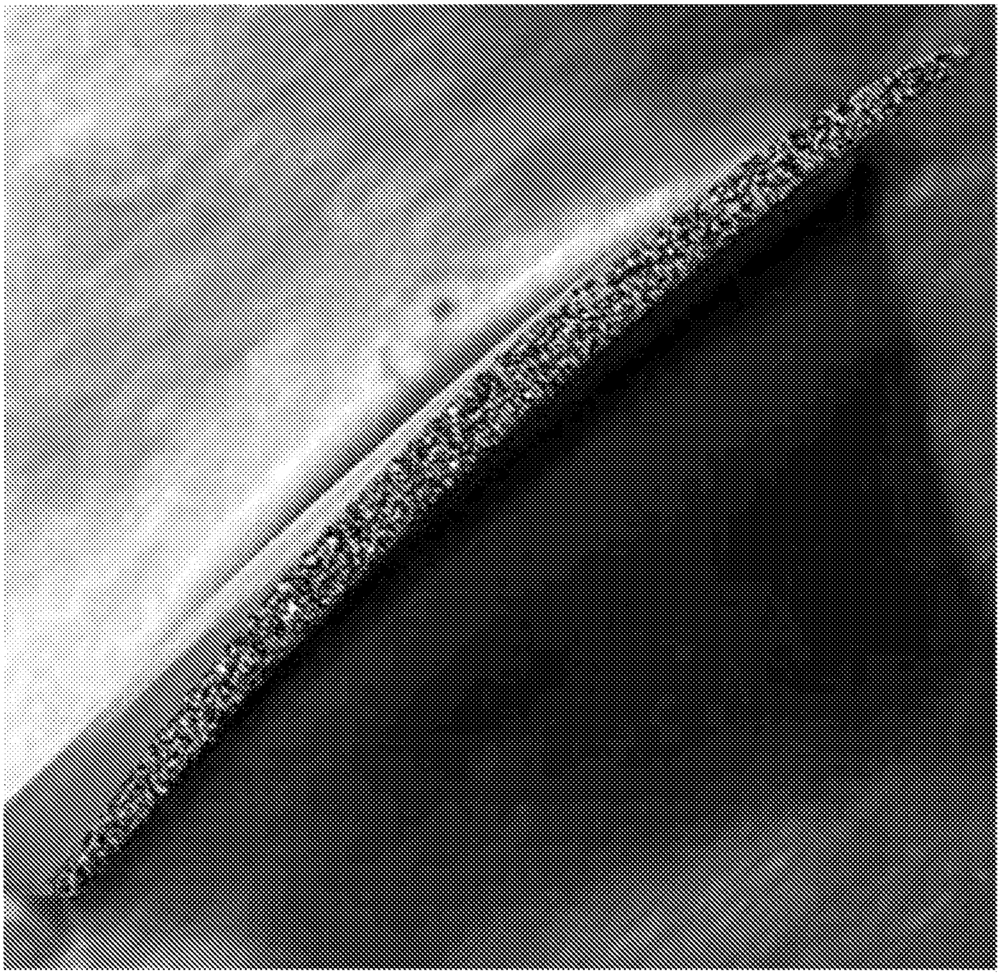
FIG. 4 illustrates an appearance of a combination of the wear-resistant protective coating and the titanium alloy experimental blade according to the embodiment 1 of the disclosure.

The cross-sectional microstructure of the coating of the titanium alloy blade tip finally prepared in this embodiment is shown in FIG. 1. From top to bottom, it is metal-abrasive composite coating (including cBN abrasive particles 1 and Ni bonding matrix 2), NiCoCrAlY base layer 3, TC4 titanium alloy 4. Its surface micro-morphology is shown in FIG. 2, and the overall structural appearance of titanium alloy blade tip with the wear-resistant protective coating is shown in FIG. 3. The coating and the titanium alloy blade tip have a good overall adhesion strength, and the coating is complete without peeling, as shown in FIG. 4. As can be seen from FIG. 1-FIG. 4, the method of the disclosure forms the wear-resistant protective coating with a high adhesion strength on the surface of the titanium alloy blade tip, with good adhesion and complete coating without shedding.

Figure 8:
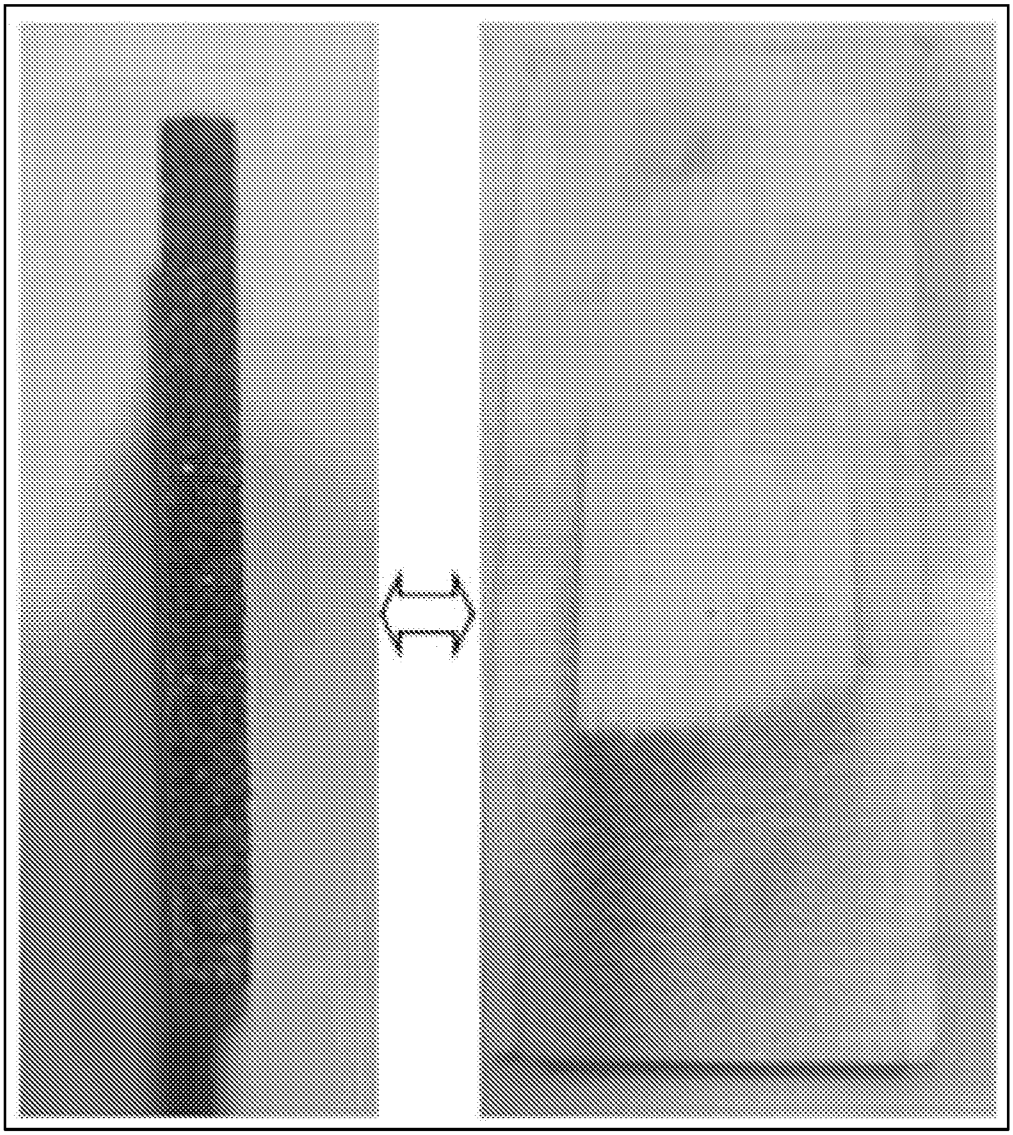
FIG. 8 illustrates an appearance picture after grinding, where a left side is an appearance of the coating of the titanium alloy blade tip after grinding test according to the embodiment 1 of the disclosure, and a right side is an appearance of a zirconia coating after grinding test.

For the titanium alloy blade tip with the wear-resistant protective coating, the adhesive-tensile test is carried out by HB5476 standard, and the bonding strength of the coating is greater than that of film, and the bonding strength is greater than 70 MPa. The obtained wear-resistant coating on the titanium alloy blade tip is ground against a titanium alloy blade tip with a porous zirconia coating with a hardness value HR15Y of 80-85 in the related art under the conditions of linear velocity of 350 m/s, ambient temperature of 600° ° C., blade tip feed speed of 50 μm/s and feed depth of 500 μm, and the wear amount (i.e., thickness reduction) is less than 0.01 mm. The appearance after counter-grinding test is shown in FIG. 8, in which the left side shows the appearance of tip coating of titanium alloy blade after counter-grinding, and the right side shows the appearance of zirconia coating after counter-grinding.

Embodiment 2

Referring to the method of the embodiment 1, the difference is that in the step 3, some parameters of the high velocity oxygen fuel spraying are different, specifically, oxygen flow rate is 1000 L/min and kerosene flow rate is 30 L/min.

The morphology and microstructure of the obtained titanium alloy blade tip with the wear-resistant protective coating are similar to those of the embodiment 1, and the coating is complete without peeling.

The corresponding test is carried out, and the measured bonding strength is greater than 70 MP, and the wear amount is less than 0.01 mm.

Embodiment 3

Referring to the method of the embodiment 1, the difference is that in the step 3, some parameters of the high velocity oxygen fuel spraying are different, specifically, the spraying distance is 300 mm.

The morphology and microstructure of the obtained titanium alloy blade tip with the wear-resistant protective coating are similar to those of the embodiment 1, and the coating is complete without peeling.

The corresponding test is carried out, and the average bonding strength is 65 MPa, and the wear amount is less than 0.01 mm.

Embodiment 4

Referring to the method of the embodiment 1, the difference is that in the step 4, the current density of nickel pre-plating is 9 A/dm$^2$.

The morphology and microstructure of the obtained titanium alloy blade tip with the wear-resistant protective coating are similar to those of the embodiment 1, and the coating is complete without peeling.

The corresponding test is carried out, and the measured bonding strength is greater than 70 MPa, and the wear amount is less than 0.01 mm.

Embodiment 5

Referring to the method of the embodiment 1, the difference is that in the step 4, the composition of the pre-plating solution for pre-plating nickel is 160 g/L of nickel chloride, 36 g/L of boric acid and 100 ml/L of hydrochloric acid (36 wt. %).

The morphology and microstructure of the obtained titanium alloy blade tip with the wear-resistant protective coating are similar to those of the embodiment 1, and the coating is complete without peeling.

The corresponding test is carried out, and the measured bonding strength is greater than 70 MPa, and the wear amount is less than 0.01 mm.

Embodiment 6

Referring to the method of the embodiment 1, the difference is that in the step 3, some parameters of the high velocity oxygen fuel spraying are different, specifically: oxygen flow rate 600 L/min and kerosene flow rate 16 L/min.

The morphology and microstructure of the obtained titanium alloy blade tip with the wear-resistant protective coating are similar to those of the embodiment 1, and the coating is complete without peeling.

The corresponding test is carried out, and the average bonding strength is 37 MPa, and the wear amount is 0.10 mm.

Embodiment 7

Referring to the method of the embodiment 1, the difference is that in the step 4, the composition of pre-plating solution for pre-plating nickel is 80 g/L of nickel chloride and 20 g/L of boric acid.

The morphology and microstructure of the obtained titanium alloy blade tip with the wear-resistant protective coating are similar to those of the embodiment 1, and the coating is complete without peeling.

The corresponding test is carried out, and the average bonding strength is 36 MPa, and the wear amount is 0.14 mm.

Comparative Embodiment 1

Figure 5:
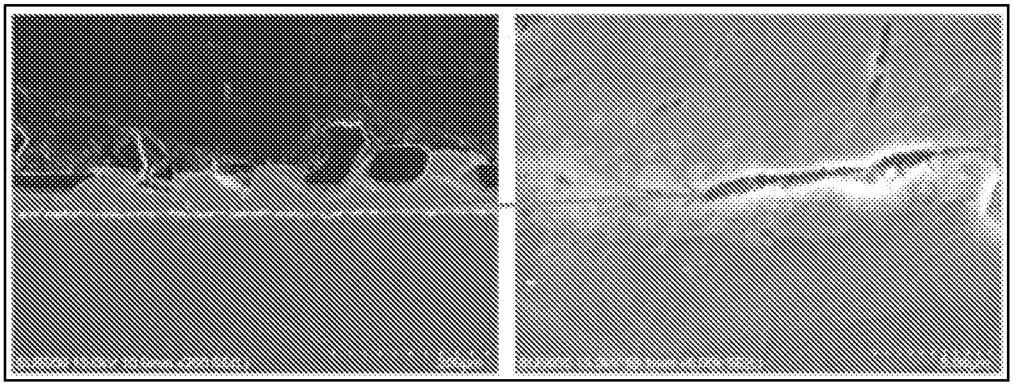
FIG. 5 illustrates a microscopic image of an interface between a coating of a blade tip and a titanium alloy blade tip prepared in a comparative embodiment 1 of the disclosure.

The titanium alloy blade tip is immersed in a solution containing 50 g/L trisodium phosphate, 20 g/L sodium fluoride and 25 ml/L hydrofluoric acid for 3 min at room temperature, and fluoride is generated by chemical reaction, thus forming a transition layer on the surface of the titanium alloy blade tip; followed by the steps 5-6 of the embodiment 1 to adhere cBN particles. The microscopic image of the interface between the coating of the blade tip and the titanium alloy blade tip is shown in FIG. 5, and it can be seen that cracks are formed in the cross section of the substrate and the coating thereon.

Figure 9:
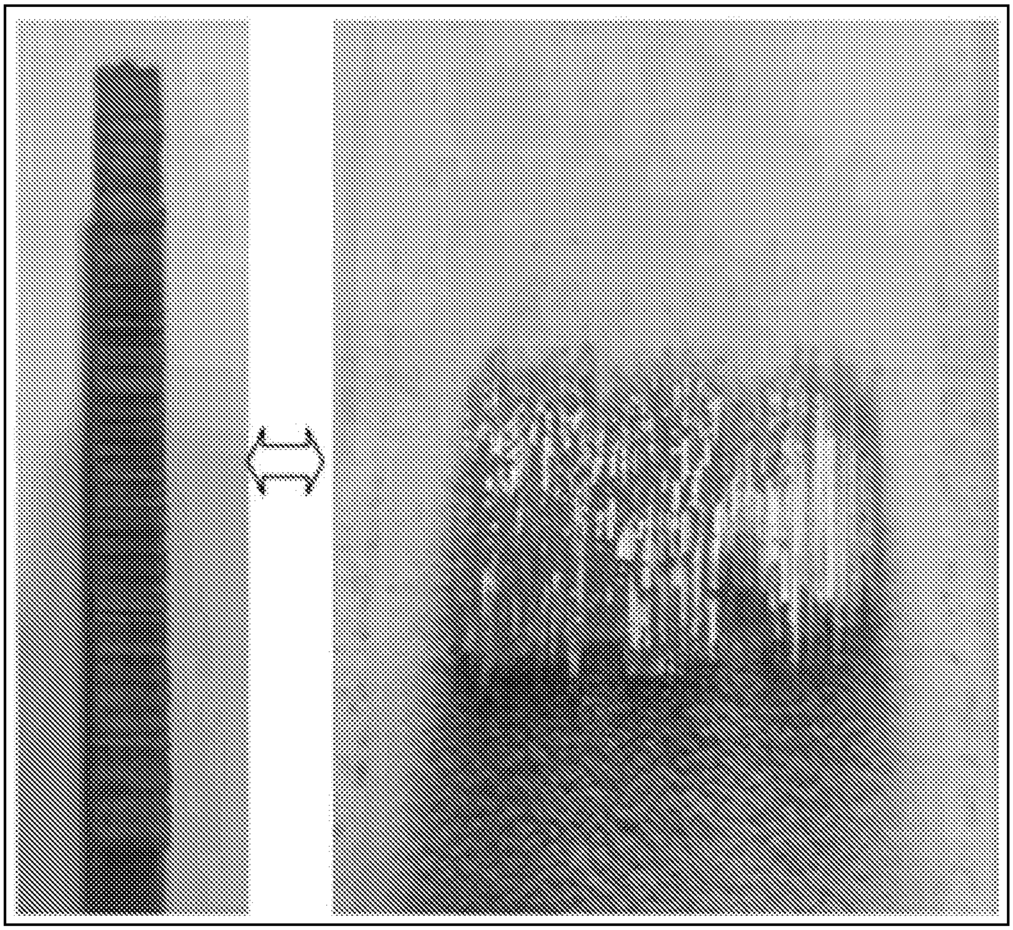
FIG. 9 illustrates a picture of an appearance after grinding, where a left side is an appearance of the coating of the titanium alloy blade tip after grinding according to the comparative embodiment 1 of the disclosure, and a right side is an appearance of the zirconia coating after grinding.

The corresponding test of the embodiment 1 is carried out, and the average bonding strength is 29 MPa, and the wear amount is 0.35 mm. The appearance after grinding test is shown in FIG. 9, in which the left side is an appearance of the coating of the titanium alloy blade tip after grinding according to the comparative embodiment 1 of the disclosure, and the right side is an appearance of the zirconia coating after grinding. It can be seen that the wear of the coating of the titanium alloy blade tip is obviously more serious than that of the embodiment 1.

Comparative Embodiment 2

Referring to the method of the embodiment 1, the difference is that in the step 4, the current density in nickel pre-plating is 2 A/dm$^2$.

Figure 6:
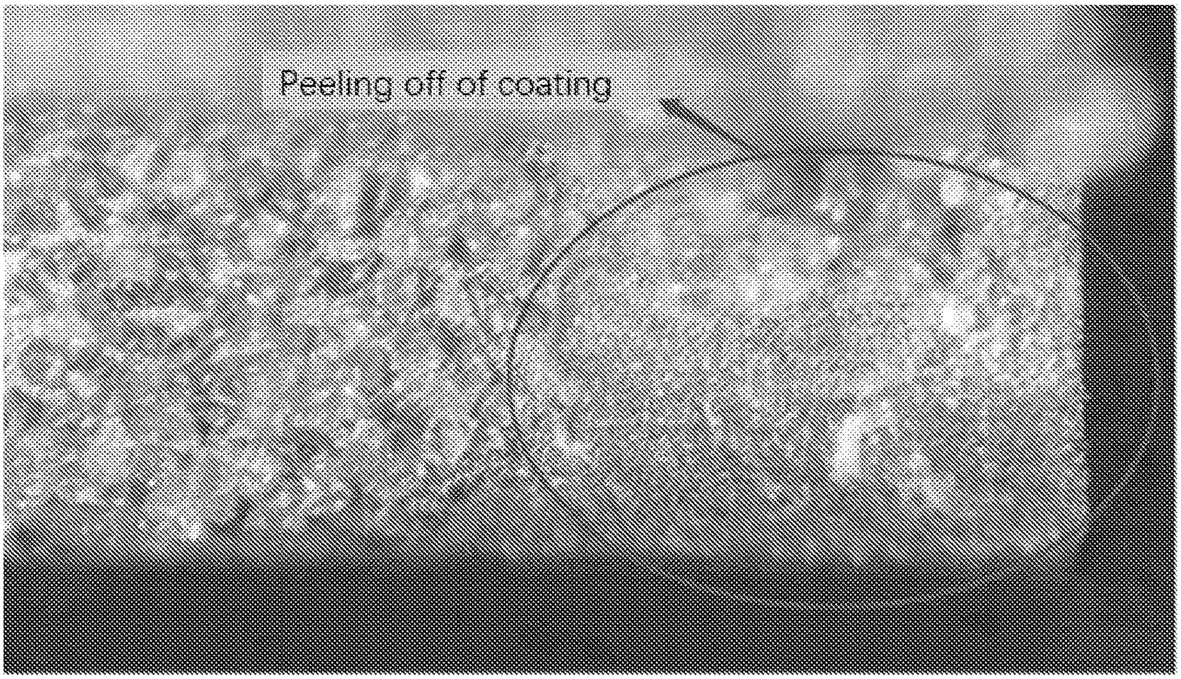
FIG. 6 illustrates a picture of a coating peeled off on a titanium alloy blade tip according to a comparative embodiment 2 of the disclosure.

In this comparative embodiment, because the current density of nickel pre-plating in the step 4 is too low, the Ni-cBN composite coating cannot form a firm bonding force with the NiCoCrAlY coating sprayed by high velocity oxygen fuel, and the bonding strength between them is less than 10 MPa. The adhesion strength of the coating of this comparative embodiment is poor, and the coating on the blade tip edge is easy to peel and peel off, as shown in FIG. 6.

Comparative Embodiment 3

Referring to the method of the embodiment 1, the difference is that in the step 3, the spraying distance in the high velocity oxygen fuel spraying is 500 mm.

Figure 7:
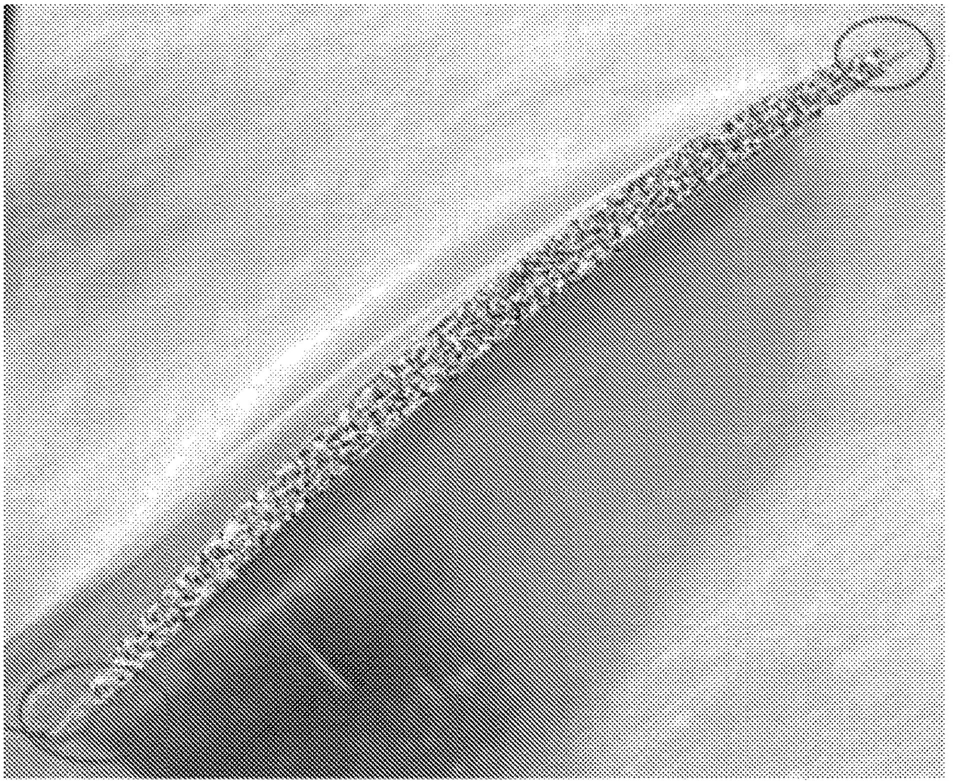
FIG. 7 illustrates a picture of a coating shedding of a titanium alloy blade tip according to a comparative embodiment 3 of the disclosure.

In this comparative embodiment, the excessive spraying distance leads to the excessive cooling of the molten NiCoCrAlY particles when they fly to the surface of the titanium alloy blade tip, and the melting state of the particles is not optimal, thus the particles cannot form a firm bonding force with the substrate. Finally, the adhesion strength of the coating of titanium alloy blade tip is insufficient, and the adhesion strength of the coating of the blade tip edge cannot resist the peeling phenomenon caused by the compressive stress of the coating, as shown in the circled place in FIG. 7.

From the above results, it can be seen that the titanium alloy blade tip with high adhesion strength and wear-resistant protective coating obtained by adopting the solution of the embodiment of the disclosure has strong adhesion strength of the coating, no cracking, no peeling off, no peeling and other shedding phenomena, excellent wear resistance and less wear loss. However, when the conventional coating is used in the comparative embodiment 1, there are cracks on the cross section of the coating, the bonding force is weak, and the wear is serious. The schemes of the comparative embodiments 2-3, which are out of the scope of the technical solutions of the disclosure, cannot achieve the technical effects of the disclosure.

In addition, according to the embodiment 1 and the embodiment 3, it can be seen that the coating has stronger adhesion strength by adopting the technical solution of optimizing the spraying distance. According to the embodiment 1 and the embodiments 6-7, it can be seen that by adopting the technical solution of optimizing high velocity oxygen fuel spraying parameters or adopting the technical solution of optimizing pre-plating solution, the coating has stronger bonding force and better wear resistance.

The illustrated embodiments of the disclosure have been described in detail above, but the disclosure is not limited thereto. Within the technical concept of the disclosure, various simple modifications can be made to the technical solution of the disclosure, including the combination of various technical features in any other suitable way. These simple modifications and combinations should also be regarded as the disclosed contents herein and belong to the protection scope of the disclosure.

What is claimed is:

1. A preparation method of a titanium alloy blade tip with a wear-resistant protective coating, comprising:

step (1) spraying M-chromium-aluminum-yttrium (MCrAlY) alloy powder on a surface of a titanium alloy blade tip by a high velocity oxygen fuel (HVOF) spraying process at a spraying distance in a range of 300-400 millimeters (mm) to obtain the titanium alloy blade tip with a MCrAlY layer on the surface; wherein M is one of nickel (Ni) and nickel-cobalt (NiCo);

step (2) pre-plating Ni at a current density in a range of 6-10 amperes per square decimeter (A/dm$^2$) on the titanium alloy blade tip with the MCrAlY layer to obtain a pre-plated titanium alloy blade tip;

step (3) placing the pre-plated titanium alloy blade tip in a Watt solution, covering a surface of the pre-plated titanium alloy blade tip obtained in the step (2) with abrasive particles, and then performing composite electroplating at a current density in a range of 0.5-2 A/dm$^2$, so as to obtain the titanium alloy blade tip with the wear-resistant protective coating.

2. The preparation method according to claim 1, wherein in the step (1), a thickness of the MCrAlY layer is in a range of 10-100 micrometers (μm), and a particle size of the MCrAlY alloy powder is in a range of 270-500 μm.

3. The preparation method according to claim 1, wherein in the step (1), conditions of the high velocity oxygen fuel spraying process comprise: 40-60 grams per minute (g/min) of powder feeding rate, 16-30 liter per minute (L/min) of kerosene flow rate, and 600-1000 L/min of oxygen flow rate;

wherein in the step (2), pre-plating time is in a range of 2-6 min, and a pre-plating solution used in the pre-plating of the Ni comprises 80-160 grams per liter (g/L) of nickel chloride, 20-40 g/L of boric acid and 0-100 milliliters per liter (mL/L) of hydrochloric acid, where a content of hydrogen chloride (HCl) in the hydrochloric acid is 30-40 weight percentage (wt %).

4. The preparation method according to claim 1, wherein in the step (1), conditions of the high velocity oxygen fuel spraying process comprise: 40-60 g/min of powder feeding rate, 20-30 L/min of kerosene flow rate, and 800-1000 L/min of oxygen flow rate;

wherein in the step (2), a pre-plating solution used in the pre-plating of the Ni comprises 120-160 g/L of nickel chloride and 36-40 g/L of boric acid.

5. The preparation method according to claim 1, wherein in the step (3), time of the composite electroplating is in a range of 0.5-3 hours (h); the Watt solution comprises 280-350 g/L of nickel sulfate, 40-150 g/L of nickel chloride and 36-40 g/L of boric acid;

wherein a thickness of a composite coating formed in the step (3) is in a range of 5-30 μm;

wherein in the step (3), the abrasive particles are selected from at least one of cubic boron nitride, aluminum oxide, and silicon carbide; and particle sizes of the abrasive particles are in a range of 50-300 μm.

6. The preparation method according to claim 1, further comprising:

step (4) removing unfixed abrasive particles after the composite electroplating in step (3) is completed; then filling a thickened coating of single metal or multi-metal between the fixed abrasive particles by electroplating; wherein a thickness of the thickened coating is in a range of 20-200 μm.

7. The preparation method according to claim 6, wherein an electroplating solution used for the composite electroplating comprises 280-350 g/L of nickel sulfate, 40-150 g/L of nickel chloride and 36-40 g/L of boric acid; or the electroplating solution comprises 300-400 g/L of the nickel sulfate, 50-150 g/L of cobalt sulfate, and 36-40 g/L of the boric acid;

wherein electroplating conditions comprise: the current density is in a range of 1.5-2 A/dm$^2$, and electroplating time is in a range of 1-4 h.

* * * * *